L. D. JONES.
ROTARY CONVERTER.
APPLICATION FILED OCT. 17, 1917.
1,263,424.
Patented Apr. 23, 1918.
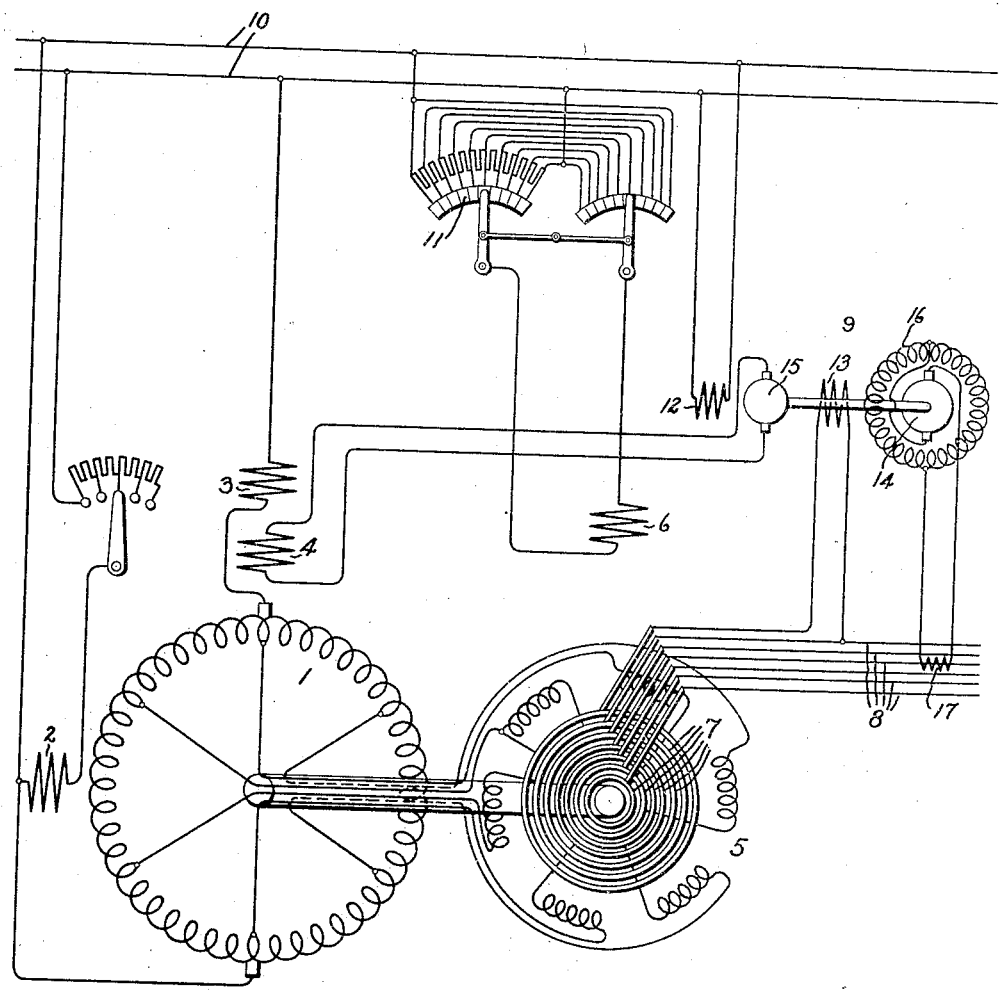
Inventor:
Laurence D. Jones,
by
His Attorney.

UNITED STATES PATENT OFFICE.

LAURENCE D. JONES, OF SCHENECTADY, NEW YORK, ASSIGNOR TO GENERAL ELECTRIC COMPANY, A CORPORATION OF NEW YORK.

ROTARY CONVERTER.

1,263,424.  Specification of Letters Patent.  Patented Apr. 23, 1918.

Application filed October 17, 1917.  Serial No. 197,157.

*To all whom it may concern:*

Be it known that I, LAURENCE D. JONES, a citizen of the United States, residing at Schenectady, in the county of Schenectady, State of New York, have invented certain new and useful Improvements in Rotary Converters, of which the following is a specification.

My invention relates to rotary converters and particularly to rotary converters provided with commutating poles and operated in connection with variable voltage boosters mechanically connected thereto. When a booster is mechanically connected to a rotary converter it impresses a motor load on the converter when boosting and a generator load on the converter when bucking; or in other words, when the booster is boosting the voltage of the converter, it must be driven as a generator by the converter, but when operating to buck the converter voltage the booster operates as a motor transmitting mechanical energy to the converter. Under such conditions, the effective armature reaction of the rotary converter varies through wide limits and directly affects the magnetization of the commutating poles. The armature reaction caused by the booster when boosting the converter voltage is in a direction to add to the excitation of the commutating poles of the converter, whereas under the bucking condition the armature reaction caused by the booster is in a direction to subtract from the excitation of the commutating poles of the converter.

My invention has for its object the provision of a novel and simple arrangement by which the strength of the commutating field may be adjusted to the correct value under all conditions of load and buck and boost.

In accordance with my invention I provide the commutating poles of the rotary converter with two windings, one of which is excited in accordance with the direct current load on the rotary converter and the other of which is excited with direct current from a rotary transformer, the alternating current end of which is energized in accordance with the voltage and the current of the booster. With such an arrangement, the commutating field strength varies with the direct current load on the converter and also directly with the changes in the booster voltage and the booster current without the lag consequent upon the use of relays and other auxiliary apparatus as employed heretofore for controlling the commutating field strength in booster type commutating pole rotary converters.

For a better understanding of my invention reference may be had to the following description taken in connection with the accompanying drawing in which the single figure shows diagrammatically one embodiment of my invention.

In the drawing, I have shown a rotary converter 1 having a main exciting winding 2, a series commutating field winding 3 and an auxiliary commutating field winding 4. The converter 1 is mechanically connected to a variable voltage booster 5 having a field winding 6. The booster is shown as being of the synchronous type connected through collector rings 7 to the alternating current mains 8 and having its alternating current windings connected to the armature winding of the converter. A rotary transformer 9 for transforming from alternating current to direct current has its direct current end connected to the auxiliary commutating field winding 4 and its alternating current end arranged to be energized in accordance with the voltage and current of the booster. The voltage generated by such a rotary transformer will vary directly with the load of the booster on the converter, and its direction will depend upon whether the load is a motor or generator load, that is, the voltage generated by the rotary transformer and consequently the field produced by the auxiliary commutating field winding 4 will vary with the voltage and current of the booster and their relative directions.

The armature of the converter 1 is shown as being connected to direct current mains 10. The field winding 6 of the booster is also connected to the mains 10 through a double dial rheostat 11 by means of which the strength of the booster field and consequently the voltage of the booster may be varied over a wide range and reversed.

The rotary transformer 9 has a field winding 12 supplied with substantially constant direct current excitation, and a field winding 13 connected so as to be supplied with current proportional to the voltage of the booster. In the rotary transformer illustrated, the field winding 12 is associated with a direct current armature 15 of a direct current generator and the field winding 13 is associated with an alternating current armature 14 of an alternating current commutator motor. The armature 15 of the direct current generator is connected to the auxiliary commutating field winding 4 of the converter and the field winding 12 of this generator is connected to the direct current mains 10 which supply it with excitation which is near enough constant for practical operation. The field winding 13 of the alternating current motor is connected across one phase of the booster winding and consequently is energized by the voltage in this phase and the armature winding 14 of this motor and a compensating winding 16 therefor is connected in series across a current transformer 17 in a phase of the booster displaced from the phase across which the field winding 13 is connected by 120 electrical degrees. The armature 14 of the motor is connected across a different phase of the booster than that across which the field winding 13 is connected because of the high reactance of the field circuit and the low reactance of the armature circuit. By connecting them as described above and as shown in the drawing the field flux and the armature current will be more nearly in phase and the torque produced by the motor and consequently its speed will be substantially proportional to the voltage and current of the booster and at unity power factor will be proportional to EI cosine 30°; where E is the voltage of one phase of the booster, and I the current in one phase of the booster. The torque produced by the motor thus will be practically proportional to the load of the booster and its direction of rotation dependent upon whether the load of the booster on the converter is a motor or a generator load, so that the voltage of the direct current generator will be proportional to the torque of the motor and therefore proportional to the load of the booster and the direction of the voltage of the direct current generator will depend upon the direction of rotation of the alternating current motor and consequently upon whether the load of the booster is a motor or a generator load. Since the auxiliary commutating field winding 4 is connected to the armature of the direct current generator the strength of the field produced by this winding will vary with the load of the booster on the converter and its direction will depend upon whether this load is a motor or generator load, or in other words, it will vary with the voltage and current of the booster and their relative directions.

As is well known, the commutating field of the converter must also be varied in accordance with the direct current load on the converter as well as in accordance with the motor or generator load of the booster and such additional excitation of the commutating poles is provided by the series commutating field winding 3. The commutating field windings 3 and 4 are provided on the same commutating poles and their effects will be additive or subtractive dependent upon whether the booster is bucking or boosting, respectively.

The booster 5 and the rotary converter 1 are shown as six phase machines but it is evident that they may be of any number of phases. The booster 5 is also shown as being of the synchronous type but obviously it might be of any well-known type. I aim in the appended claims to cover all such modifications as well as any others which do not depart from the spirit and scope of my invention.

What I claim as new and desire to secure by Letters Patent of the United States, is:—

1. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, the alternating current end of said rotary transformer means being energized in accordance with the voltage and current of said booster.

2. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, the alternating current end of said rotary transformer means being energized in accordance with the voltage and current of said booster and their relative directions.

3. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, the alternating current end of said rotary transformer means being connected so as to be supplied with currents proportional to the voltage and current of said booster.

4. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, the alternating current end of said rotary transformer means being connected so as to be supplied with currents proportional to the voltage and current of said booster and their relative directions.

5. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, said rotary transformer means having windings, one of which is connected so as to be supplied with current proportional to the voltage of the booster and another of which is connected so as to be supplied with current proportional to the current of the booster.

6. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, said rotary transformer means having a field winding and an armature winding, said field winding being connected so as to be supplied with current proportional to the voltage of the booster and said armature winding being so connected as to be supplied with current proportional to the current of said booster.

7. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, said rotary transformer means having a field winding supplied with substantially constant direct current excitation, a winding connected so as to be supplied with current proportional to the voltage of the booster and another winding connected so as to be supplied with current proportional to the current of the booster.

8. In combination, a rotary converter having a commutating field winding excited in accordance with the direct current load on the converter and an auxiliary commutating field winding, a variable voltage booster mechanically connected to said rotary converter, and rotary transformer means for transforming from alternating current to direct current, the direct current end of said rotary transformer means being connected to said auxiliary commutating field winding, said rotary transformer means having a field winding supplied with substantially constant direct current excitation, a field winding connected so as to be supplied with current proportional to the voltage of the booster and an armature winding connected so as to be supplied with current proportional to the current of said booster.

9. In combination, a rotary converter having a commutating field winding excited in accordance with the direct current load on the converter and an auxiliary commutating field winding, a variable voltage booster mechanically connected to said rotary converter, and rotary transformer means comprising a direct current generator and an alternating current motor, said direct current generator being connected to said auxiliary commutating field winding, said alternating current motor being energized in accordance with the voltage and current of said booster.

10. In combination, a rotary converter having a commutating field winding excited in accordance with the direct current load on the converter and an auxiliary commutating field winding, a variable voltage booster mechanically connected to said rotary converter, and rotary transformer means comprising a direct current generator and an alternating current motor, said direct current generator being connected to said auxiliary commutating field winding, said alternating current motor being energized in accordance with the voltage and current of said booster and their relative directions.

11. In combination, a rotary converter having a commutating field winding excited in accordance with the direct current load on the converter and an auxiliary commutating field winding, a variable voltage booster mechanically connected to said rotary converter, and rotary transformer means comprising a direct current generator and an alternating current motor, said direct current generator being connected to said auxiliary commutating field winding and having a field winding supplied with substantially constant direct current excitation, said alternating current motor having a winding connected so as to be supplied with current proportional to the voltage of the booster and another winding connected so as to be supplied with current proportional to the current of the booster.

12. In combination, a rotary converter having a commutating field winding excited in accordance with the direct current load on the converter and an auxiliary commutating field winding, a variable voltage booster mechanically connected to said rotary converter, and rotary transformer means comprising a direct current generator and an alternating current motor, said direct current generator being connected to said auxiliary commutating field winding and having a field winding supplied with substantially constant direct current excitation, said alternating current motor having a field winding connected so as to be supplied with current proportional to the voltage of the booster and an armature winding connected so as to be supplied with current proportional to the current of said booster.

In witness whereof, I have hereunto set my hand this 16th day of October, 1917.

LAURENCE D. JONES.

Copies of this patent may be obtained for five cents each, by addressing the "Commissioner of Patents, Washington, D. C."